Dec. 9, 1930.  L. L. DOLLINGER  1,784,278
METHOD AND APPARATUS FOR FILTERING AND CLEANING FILTERS
Filed April 1, 1925  3 Sheets-Sheet 1
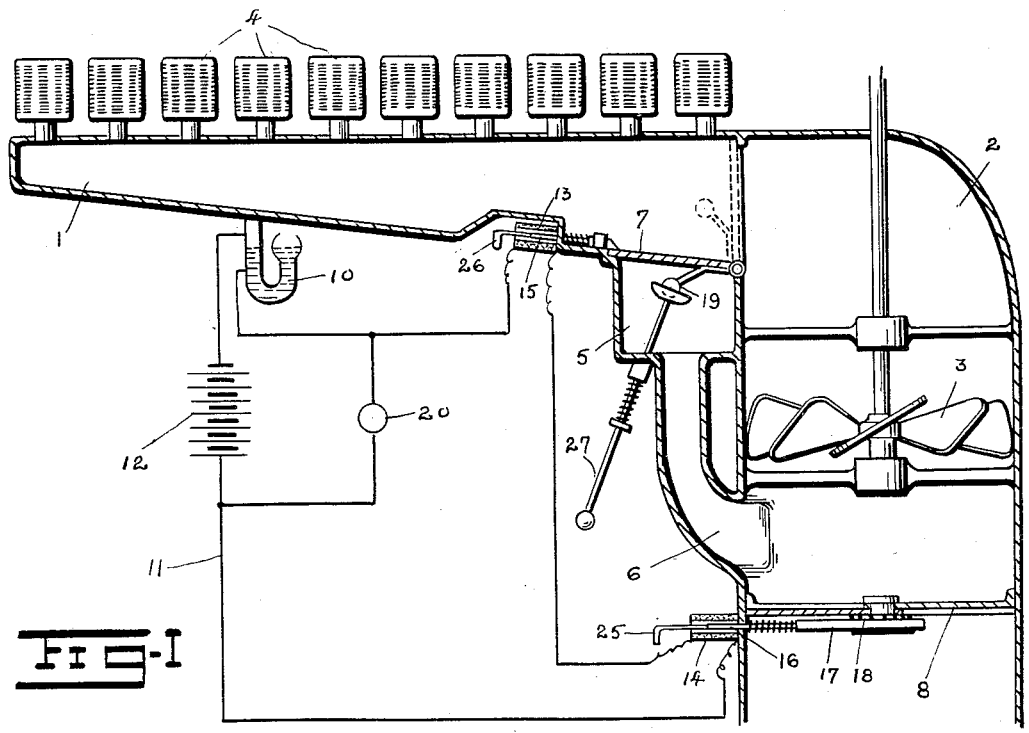
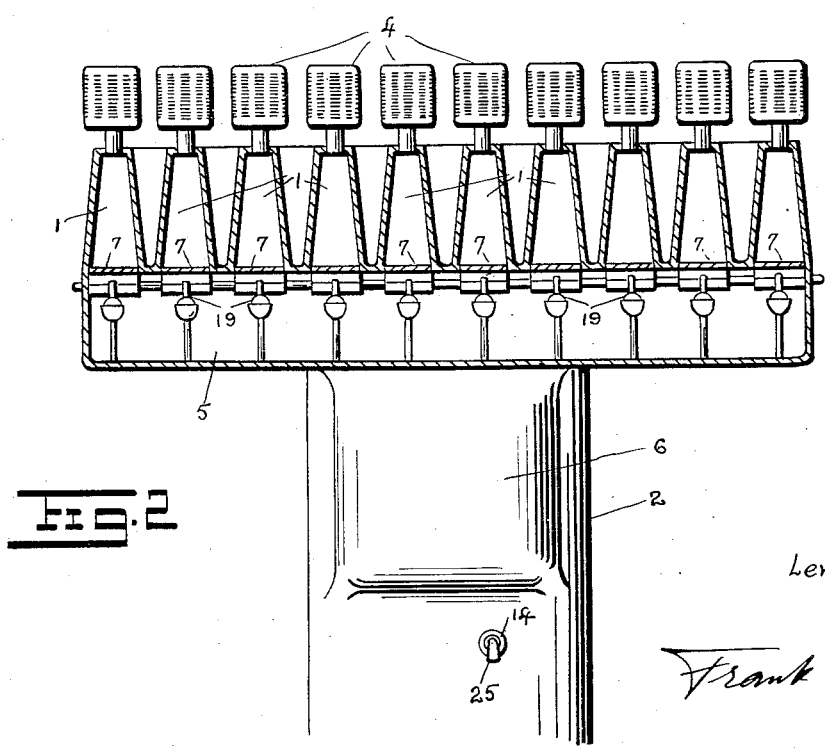
Inventor
Lewis L. Dollinger
Frank Keiper
Attorney

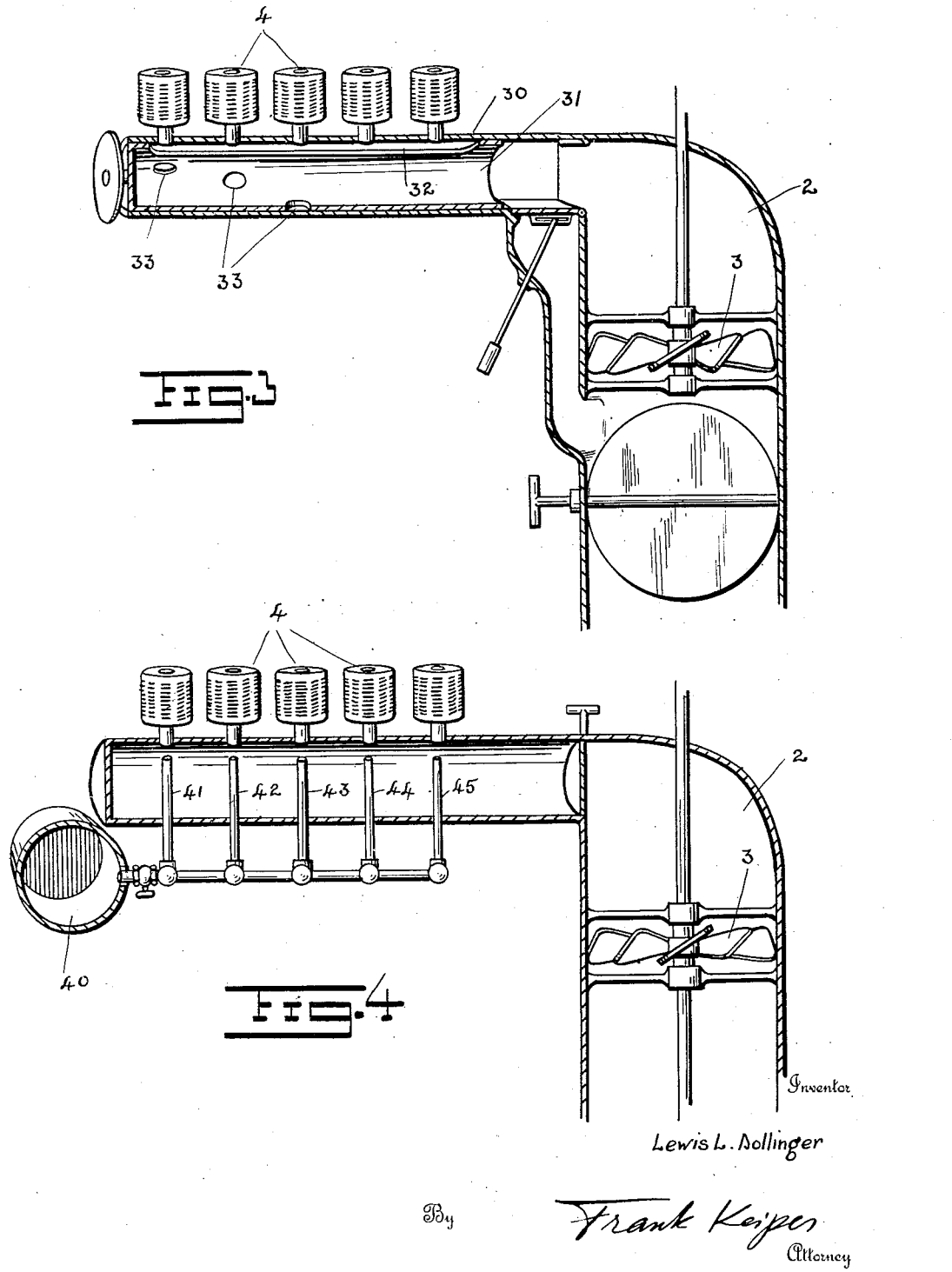

Dec. 9, 1930.  L. L. DOLLINGER  1,784,278
METHOD AND APPARATUS FOR FILTERING AND CLEANING FILTERS
Filed April 1, 1925   3 Sheets-Sheet 3
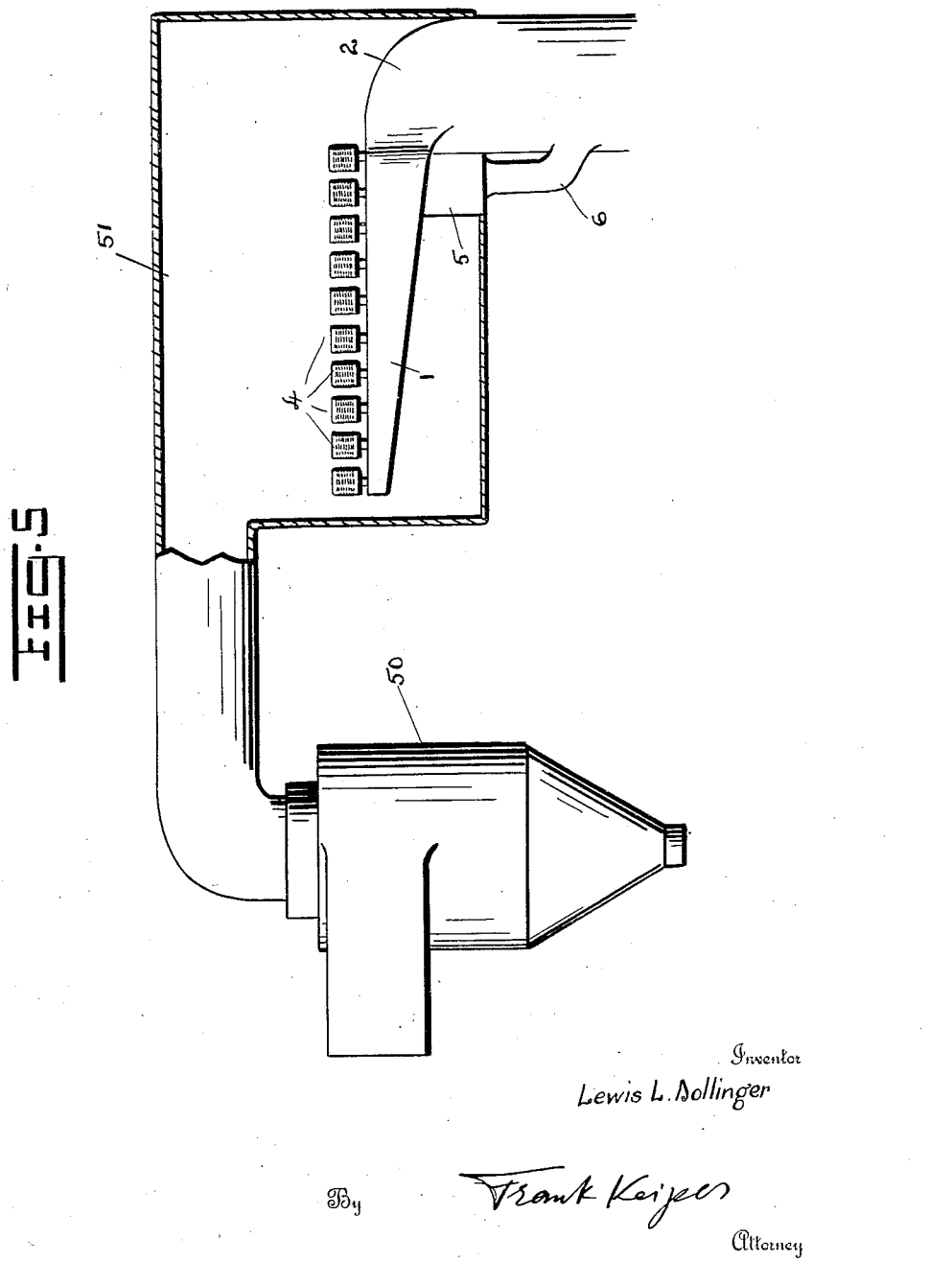
Inventor
Lewis L. Dollinger
By Frank Keiper
Attorney Patented Dec. 9, 1930

1,784,278

UNITED STATES PATENT OFFICE

LEWIS L. DOLLINGER, OF ROCHESTER, NEW YORK, ASSIGNOR TO STAYNEW FILTER CORPORATION, OF ROCHESTER, NEW YORK, A CORPORATION OF NEW YORK

METHOD AND APPARATUS FOR FILTERING AND CLEANING FILTERS

Application filed April 1, 1925. Serial No. 20,002.

The object of this invention is to provide an improved method of mounting and grouping a series of filters that will permit the filtering of a large volume of air.

Another object of the invention is to provide means whereby the filters can be readily cleaned in groups without detaching or replacing any parts of the filtering units.

These and other objects of this invention will be fully illustrated in the drawing, described in the specification and pointed out in the claims at the end thereof.

In the accompanying drawing:

Figure 1 is a longitudinal vertical section of the filter mounting.

Figure 2 is a vertical cross section of the filter mounting.

Figure 3 is a sectional view showing a modified form of the system for cleaning the filters by a blast of air flowing through them in the reverse direction.

Figure 4 is a vertical section showing another modification for cleaning the filters by the use of a blast of compressed air.

Figure 5 is a view of the system in which a cyclone dust collector is used for cleaning the air before it passes through the filters, the filters being shown in a closed chamber.

In the figures of the drawing like reference numerals indicate like parts.

The method and means for mounting and cleaning filters both air and liquid filters forming the subject matter of my present invention is intended for large installations requiring a large number of filters. These filters are divided into groups and each group is mounted on a separate intake duct that leads into the intake proper.

As illustrated in the drawing the mounting of the filtering units comprises a series or horizontal intake ducts 1, 1 that branch out from the vertical intake pipe or main 2 at the upper end thereof. In the vertical intake pipe is mounted a suction fan or blower 3 by means of which the air or liquid is drawn from the ducts 1 into the intake pipe. On top of each of the ducts 1 is mounted a series of filters 4, 4 thru which the air is drawn into the ducts. The filters mounted on the ducts are of the type illustrated in the Patent No. 1,474,412 issued to me on November 20, 1923, and use for their filtering material a layer of felt or other similar material. This type of filtering unit has been found in practice to be very efficient and performs its work for a long time until the outside of the filtering material is covered with the foreign matter separated or filtered from the air and more or less obstructs the passage of air thru the porous filtering material. It is, therefore, desirable to free the outer surface of the filtering material from the foreign matter adhering to it from time to time or whenever an indicating device shows that the filters are clogged up and not enough air passes thru them.

In order to clean the filtering units I reverse the air or liquid drawn thru a large number of the filtering units and force it back thru a small number of filtering units in the reverse direction.

To make this possible a small number of the filtering units are mounted on individual intake ducts that lead into the intake proper. As illustrated in Figure 1 each duct carries a series of filtering units at the top thereof and the cross section of the duct is designed to provide ample area for all the air or liquid that is drawn thru the filtering units to readily pass therethru. The sides of the ducts are inclined so that a minimum amount of dirt or dust can collect on the top of the ducts and so that the foreign matter dropping off from the filtering units will readily slide off the inclined sides of the duct.

All of the intake ducts have an opening in the bottom that leads into the manifold 5. This manifold extends under all of the intake ducts at the inner ends thereof and is connected with the intake proper by a by-pass duct 6 that leads from the intake 2 at a point below the fan or blower 3 into the bottom of the manifold. A swinging shutter 7 provided in each of the intake ducts normally closes the opening connecting the intake duct with the manifold. This shutter is mounted to swing on a suitable pivot and is adapted to swing into a vertical position as indicated in dotted lines in Figure 1. In so doing the shutter opens the opening leading into the manifold but closes the end of the intake duct leading into the intake pipe 2.

In the intake pipe, at a point below the fan or blower 3 and the entrance of the by-pass duct 6 is mounted a shutter 8. This shutter may be any one of the well known sliding or rotating types and is adapted to quickly close the intake pipe for a purpose that will presently appear. Each of the intake ducts may also be provided with a vacuum indicator 10. This may be either a diaphragm such as used in the aneroid barometer or it may be a barometric U tube as illustrated in Figure 1 that is operated when a partial vacuum is created within the intake duct.

When the filters have been in operation for some time a certain amount of foreign matter filtered from the air has adhered to the outside of the filtering material and more or less obstructs the passage of air thru the filtering units. This causes a partial vacuum within the intake duct because the fan or blower 3 has a capacity that is not satisfied by the restricted volume of air passing thru the clogged up filtering units.

The partial vacuum operates to raise the mercury column in the U tube 10 and in doing so closes the electric circuit 11. A battery 12 or other electric current generating units supplies this circuit with current so that when the circuit is closed electro-magnetic energy is created in the solenoids 13 and 14. These solenoids are connected in series with the contacts in the U tube and when energized as above described they act as magnets and operate to move their armatures 15 and 16 respectively. The movement of the armatures 16 of the solenoid 14 moves the rack 17 and as this rack meshes with the pinion 18 carried by the shutter 8 this shutter is closed on the operation of the solenoid 14.

At the same time the shutter 8 is closed by the solenoid 14, the solenoid 13 operates to release the swinging shutter 7. For this purpose the armature 15 of the solenoid 13 is attached to the spring pressed latch which normally locks the shutter in place in the opening leading into the manifold 5. When the latch is withdrawn as above described the shutter is free to swing open. The shutter is swung open by the force of the air which is directed into the manifold 5 as soon as the shutter 8 in the intake 2 is closed so that all of the air from the intake ducts passes thru the by-pass duct 6 into the manifold 5. The shutter 7 of one or more of the intake ducts released by its solenoid latch is then forced open by the pressure of the air located in the manifold. In the opening, the shutter swings from its horizontal position to a vertical position and in so doing closes the end of the intake duct so that no air can be drawn from it but on the other hand all of the air rushing from the manifold into the intake duct thus opened must pass thru the filtering units mounted on the duct. The air thus forced into the filtering units from the inside blows off the foreign matter adhering to the outside of the filtering unit and cleans the filtering material so that the filters can again filter air at their rated capacity.

From the foregoing it will be seen that the cleaning of the filtering units is done by reversing the air from a large number of the filtering units and passing the large quantity of air in the reverse direction thru a small number of the filtering units. In this way the air for cleaning the filters is given a velocity that is very much greater than the velocity of the air that ordinarily passes thru them for filtering purposes so that all of the foreign matter adhering to the outside of the filtering material in filtering the air is readily blown off by the force of the air passing thru it from the inside of the filters.

As soon as the partial vacuum in the intake ducts is destroyed by the admission of the large volume of air as above described, the mercury column in the U tube 10 drops and breaks the circuit 10. This in turn de-energizes the solenoids 13 and 14 and allows the compression springs surrounding the armatures of the solenoids to return the armatures to their normal position so that the shutter 8 in the intake is again opened for the air to pass therethru. At the same time the swinging shutter 7 drops back to its normal position as the counterweight 19 carried by the swinging shutter is no longer opposed by the force of an inrushing air current thru the opening in the bottom of the intake duct.

In this way the filtering units carried on the intake ducts are cleaned in the manner that will not interfere with the operation of the filter for not more than only short intervals at a time and without having to take out or replace any of the parts of the filter.

A signal light 20 or indicator is suitably connected in the circuit for operating the shutters and indicates whenever the filtering units of one of the intake ducts is being cleaned as above described.

The filters may be cleaned at will without the automatic operating mechanism by closing the shutter 8 and releasing the shutter 7 manually. For this purpose each of the armatures of the solenoids for operating these shutters is provided with an extension on which the handles 25 and 26 are provided. In addition to this a sliding rod 27 is mounted in the manifold 5 one for each of the shutters 7. The ends of these sliding rods engage the counter weights of the shutters 7 and when pushed up open these shutters to admit the air from the manifold into the duct that is opened by the shutter. In this case the vacuum indicator may be attached to the intake above the fan to indicate collectively the partial vacuum in all of the filters.

The mounting of the filtering units and the manner in which they are cleaned as above described is also useful in reclaiming material floating in the air. The operation for this purpose remains the same except that the object of the mechanism is different.

In Figures 3 and 4 I have illustrated two modified forms of mounting the filtering units. The form illustrated in Figure 3 provides means whereby each individual filtering unit can be cleaned separately. For this purpose the ducts 30 are made cylindrical and have another tube 31 mounted to rotate within it. This second tube is provided with an elongated slot 32 that connects all of the inlets of the filtering units mounted on the duct 30. Besides the elongated slot the tube 31 is also provided with a series of holes 33 that are staggered so that each hole can be brought to register with one of the filtering units while the remainder of the filtering units are shut off. In this way the intake from each of the filtering units can be separately opened while the intake of the remainder of the filtering units are closed. A reverse current of air admitted into the duct on which the filtering units are mounted is thus made to pass thru but one of the filtering units at an increased velocity instead of thru all of the filtering units at a much slower velocity.

The arrangement of the filters illustrated in Figure 4 makes it possible to clean the filters with compressed air. For this purpose a compressed air tank 40 is provided and from this tank compressed air is forced thru the pipes 41, 42, 43, 44 and 45 and directed into the inside of the filtering units to clean the filtering material by blowing off from the inside the foreign matter adhering to the outside of the filtering material.

In Figure 5 I have illustrated the filtering units and its mounting in connection with the well known cyclone dust collector. This dust collector is indicated by reference numeral 50 and is connected to the air chamber 51 into which it discharges the air passed thru it. In the air chamber 51 is mounted a series of my filtering units supported on a mounting such as has been described above and thru which the air from the cyclone dust collector is passed to again filter the air before it is passed on to the point where it is to be used.

It will be understood that while this filter is intended to be used for filtering air, it will also be understood that it can be used for other purposes such as for filtering the oil from steam and for filtering other gases and vapors and can also be used for filtering liquids such as water, oil, etc., and all such uses are within the scope of the invention and when the word "air" is used herein it will be understood to mean or include any and all other gases, vapor or liquids which can pass through this filter and be filtered or cleaned thereby.

I claim:

1. The method of filtering and cleaning filters which consists in dividing the filter into sections and drawing the material to be filtered from a large number of these sections at low velocity and returning it thru the small remaining number of the filter sections at a higher velocity.

2. In an air filter, the combination of an intake, a series of ducts leading to said intake, a filtering unit carried by each of said ducts, means for automatically reversing the air current entering said intake and forcing the reversed air current thru one of said ducts and the filtering unit carried thereby.

3. In an air filter, the combination of a main, a series of ducts leading into said main, an inlet in each of said ducts, a filtering unit carried by each of said ducts and connected to each of said inlets, and means to draw fluid thru one or more of said ducts into said main and return the fluid thru another single duct and force it thru its filtering unit in the reverse direction.

4. The method of filtering and cleaning a filter having a series of filtering units connected to a series of intake ducts which consist in drawing the material to be filtered in thru a plurality of the intake ducts and the filtering units connected thereto and alternately returning this material thru another of the series of intake ducts and the filtering units connected thereto at a higher velocity.

In testimony whereof I affix my signature.

LEWIS L. DOLLINGER.